United States Patent
Buddhikot et al.

(10) Patent No.: US 8,042,017 B2
(45) Date of Patent: Oct. 18, 2011

(54) APPARATUS AND METHOD FOR PRACTICAL AND EFFICIENT BROADCAST IN MOBILE AD HOC NETWORKS

(75) Inventors: Milind M Buddhikot, Manalapan, NJ (US); Li Li, Edison, NJ (US); Scott C Miller, Freehold, NJ (US); Ramachandran Ramjee, Summit, NJ (US)

(73) Assignee: Alcatel Lucent, Paris (FR)

( * ) Notice: Subject to any disclaimer, the term of this patent is extended or adjusted under 35 U.S.C. 154(b) by 1153 days.

(21) Appl. No.: 11/789,287

(22) Filed: Apr. 24, 2007

(65) Prior Publication Data
US 2008/0267106 A1    Oct. 30, 2008

(51) Int. Cl.
*G08C 25/02* (2006.01)
*H04L 1/18* (2006.01)

(52) U.S. Cl. .......... 714/748; 370/328; 370/331; 370/338
(58) Field of Classification Search .................. 714/748; 370/328, 331, 338
See application file for complete search history.

(56) References Cited

U.S. PATENT DOCUMENTS

| | | | |
|---|---|---|---|
| 6,975,613 B1 * | 12/2005 | Johansson | 370/338 |
| 2008/0002599 A1 * | 1/2008 | Yau et al. | 370/310 |
| 2009/0268662 A1 * | 10/2009 | Larsson et al. | 370/328 |

OTHER PUBLICATIONS

Lou et al. Toward Broadcast reliability in Mibile Ad Hoc Networks with Double Coverage. Feb. 2007, IEEE Transactions on Mobile Computing, vol. 6, No. 2 pp. 148-163.*
Lou et al. On Reducing Broadcast Redundancy in Ad Hoc Wireless Networks. Apr. 2002. IEEE transactions on Mobile Computing, vol. 1, No. 2. pp. 111-122.*

* cited by examiner

*Primary Examiner* — Sam Rizk
(74) *Attorney, Agent, or Firm* — Matthew J. Hodulik (57) ABSTRACT

The present invention demonstrates how network-coding can be applied to a deterministic broadcast approach, resulting in significant reductions in the number of transmissions in the network. We propose two algorithms, that rely only on local two-hop topology information and make extensive use of opportunistic listening to reduce the number of transmissions: 1) a simple XOR-based coding algorithm and 2) a Reed-Solomon based coding algorithm that determines the optimal coding gain achievable for a coding algorithm that relies only on local information.

20 Claims, 10 Drawing Sheets

JOINT FORWARDING AND CODING

FIG. 1A

| v | $P_1$ | $P_2$ | $P_3$ | $P_4$ | $P_5$ |
|---|---|---|---|---|---|
| r | 1 | 0 | 1 | 0 | 1 |
| s | 0 | 1 | 0 | 1 | 0 |
| t | 1 | 0 | 1 | 0 | 0 |
| u | 1 | 0 | 0 | 0 | 1 |

FIG. 1B

Process(p) - On receiving a new packet $p$
      or on time-out of a buffered packet $p$
1. Update $N\,br\,RecvTable(p)$
2. if $u \notin Fwder(p)$ return;
3. if $all\,N\,br\,Recv(p)$ return;
4. if $N\,ative(p)$, then
5.   $B = getCodeSet()$;
6.   if $(|B| > 1)$ then
7.     $sendCodedPkts(B)$;
8.   else
9.     if $(!Timeout(p))$ then
10.       $Queue(p, \mathcal{T})$;
11.     else $sendN\,ative(p)$;
12.     endif
13.   endif
14. else
15.   foreach $q = decode(p)$
16.     $Process(q)$
17.   endfor
18. endif

FIG. 2
PACKET PROCESSING PROCEDURE OF NODE $u$

```
getCodeSet()
Pick packet p at the head of the output queue
1.  B = p
2.  foreach remaining packet q in the queue
3.      foreach neighor v
4.          if (cannotdecode(p ⊕ q)) then
5.              goto line 10;
6.          endif
7.      endfor
8.      B = B ∪ q
9.      p = p ⊕ q
10.     continue
11. endfor
12. return B
```

*FIG. 3*

CODING PROCEDURE OF NODE $u$ USING XOR

```
getCodeSet()
1. Pick native packet set P in the output queue
2. k = maxMissingPackets(N(u), P)
3. if (k >= |P|) then return empty set; endif
4. Construct encoded packet set Q = Θ P
5. Add packet ID of each packet p ∈ P to qi
6. Add the row index i of Θ to qi
7. return Q
```

*FIG. 4*

CODE PROCEDURE OF NODE $u$ USING REED-SOLOMON (RS) CODE

FIG. 5B
PACKET DELIVERY RATIO FOR LOW LOAD

FIG. 5A
CODING GAIN FOR LOW LOAD

FIG. 5D
PACKET DELIVERY RATIO FOR HIGH LOAD

FIG. 5C
CODING GAIN FOR HIGH LOAD

FIG. 6B
PACKET DELIVERY RATIO FOR LOW LOAD

FIG. 6A
CODING GAIN FOR LOW LOAD

FIG. 6D
PACKET DELIVERY RATIO FOR HIGH LOAD

FIG. 6C
CODING GAIN FOR HIGH LOAD

FIG. 7B
PACKET DELIVERY RATIO FOR LOW LOAD

FIG. 7A
CODING GAIN FOR LOW LOAD

FIG. 8B
PACKET DELIVERY RATIO

FIG. 8A
CODE:RScode over CODE+GOSSIP

*FIG. 9*

JOINT FORWARDING AND CODING

*FIG. 10*

APPARATUS AND METHOD FOR PRACTICAL AND EFFICIENT BROADCAST IN MOBILE AD HOC NETWORKS

TECHNICAL FIELD

This invention relates generally to the field of telecommunications and in particular to mobile ad hoc telecommunications networks

BACKGROUND OF THE INVENTION

Mobile ad hoc networks (MANETs) are an important technology for mission critical military communications. They enable communication between a group of nodes to form a network in absence of infrastructure components such as base stations and power sources. The nodes themselves are often portable radios in soldier's backpacks, in combat vehicles, etc where size, weight, energy efficiency, and the ability to maintain reliable communication are key constraints. The applications that use these networks often require continuous "group communication". For example, soldiers in a team may be continuously exchanging voice messages, or a set of battlefield tanks may be exchanging shared situation awareness information such as their locations or their targets. Furthermore, even in the case of unicast routing in mobile ad hoc networks, flooding or broadcast is frequently used to discover unicast routes between a source and a destination. Thus, efficient support for group broadcast semantics, where data is sent to all or most of the nodes, is critical for these networks.

To date, research on efficient broadcast support in mobile ad hoc networks has proceeded along two main approaches: probabilistic and deterministic. Probabilistic or gossiping-based approaches require each node to rebroadcast the packet to its neighbors with a given forwarding probability. The key challenge with these approaches is to tune the forwarding probability: keeping it as low as possible for maximum efficiency while maintaining it high enough, so that all the nodes are able to receive the broadcast packets. Deterministic approaches on the other hand predetermine and select the neighboring nodes that forward the broadcast packet. If the complete topology is used (feasible for static ad hoc networks), a good approximation algorithm, such as that described by K. M. Alzoubi, P. J. Wan, and O. Frieder, in "New distributed algorithm for connected dominating set in wireless ad hoc networks," in HICSS, 2002, for constructing a small connected dominating set-based based approach will yield very few transmissions to reach all nodes; otherwise, pruning-based solutions based on one or two hop topology information have to be adopted.

Separately, network coding, i.e. allowing intermediate nodes to combine packets before forwarding, has been shown to significantly improve transmission efficiency in wired networks. See for example, R. Ahlswede, N. Cai, S. Li, and R. Yeung, "Network information flow," IEEE Transactions on Information Theory, 2000. Recently, network coding has been adapted to support unicast and multicast applications in wireless networks. In "A network coding approach to energy efficient broadcasting: from theory to practice," by C. Fragouli, J. Widmer, and J.-Y. L. Boudec in IEEE Infocom, April 2006, network coding is shown to be adapted to a probabilistic approach for supporting broadcast in mobile ad hoc networks. However, this approach has several drawbacks. As mentioned earlier, fine-tuning the forwarding probability in probabilistic approaches is a difficult problem—in order to ensure that most nodes receive the broadcast; one typically chooses a higher forwarding probability that results in inefficiencies compared to a deterministic approach. Also, the approach described by Fragouli et al. has to group packets transmitted from various sources into globally unique sets called generations, where solving in a distributed manner is a difficult problem and limits coding gains. Furthermore, the use of a globally unique set of coded packets implies that the decoding delay can be large, since enough information must be received from the various sources before a generation can be decoded at a node.

The problem of broadcast support in mobile ad hoc networks has been extensively studied. The high overhead of using naive flooding to support broadcast was highlighted in an article by S. Ni, Y. Tseng, Y. Chen, and J. Sheu, "The broadcast storm problem in a mobile ad hoc network," in Proceedings of the 5th annual international conference on Mobile computing and networking, pp. 151-162, 1999. Since then, researchers have adopted either deterministic or probabilistic approaches to support broadcast efficiently.

Under deterministic approaches, if complete topology information is known, a connected dominating set-based approach will yield optimal results. However, for mobile ad hoc networks, the availability of complete topology information, that remains current for reasonable durations, is unrealistic. Thus, algorithms that rely only on local topology information were developed. In H. Lim and C. Kim, "Flooding in wireless ad hoc networks," Computer Communications Journal, vol. 24, no. 3-4, pp. 353-363, 2001, the authors propose two algorithms called self pruning and dominant pruning that rely on 1-hop and 2-hop neighborhood information respectively, to reduce redundant broadcasts as compared to a flooding based approach. In W. Lou and J. Wu, "On reducing broadcast redundancy in ad hoc wireless networks," IEEE Transactions on Mobile Computing, vol. 1, no. 2, pp. 111-123, 2002, the authors propose total dominant pruning and partial dominant pruning (PDP) that rely on 3-hop and 2-hop neighborhood information respectively, to improve on the proposals by Lim and Kim above.

Recently, there has been interest in the use of network coding to improve transmission efficiency in networks. In the article by R. Ahlswede, N. Cai, S. Li, and R. Yeung, "Network information flow," IEEE Transactions on Information Theory, 2000. The article showed networks that allow intermediate nodes to combine information before forwarding results in significant throughput gains over networks with intermediate nodes that only forward information. Support for multicast and broadcast in wireless networks with network coding can also be addressed either using deterministic or probabilistic approaches. Under probabilistic approaches, authors in Fragouli et al. show that practical coding-based probabilistic schemes significantly outperform non-coding based probabilistic schemes. Under deterministic approaches, articles by D. et al., "Achieving minimum-cost multicast: A decentralized approach based on network coding," in IEEE Infocom, March 2005 and Y. Wu, P. Chou, and S.-Y. Kung, "Minimum-energy multicast in mobile ad hoc networks using network coding," IEEE Transactions on communications, vol. 53, no. 11, pp. 1906-1918, 2005 study theoretical solutions based on solving linear programs that assume knowledge of the entire network topology and show significant gains in terms of efficiency and computational overhead over approaches that do not use network coding. Practical and deterministic coding-based schemes for support of unicast traffic in wireless networks have been studied in an article by S. Katti, D. Katabi, W. Hu, H. Rahul, and M. Medard, "The importance of being opportunistic: Practical network coding for wireless environments," in ACM Sigcomm, September 2006. However, none of the prior art references set forth a practical and deterministic coding-based schemes that use only local topology information for efficient support of broadcasts. Accordingly, there is a need for such a system.

SUMMARY OF THE INVENTION

Broadcast operation, which disseminates information network-wide, is very important in multi-hop wireless networks. Due to the broadcast nature of wireless media, not all nodes need to transmit in order for the message to reach every node. Previous work on broadcast support can be classified as probabilistic (each node rebroadcasts a packet with a given probability) or deterministic approaches (nodes pre-select a few neighbors for rebroadcasting). The present invention demonstrates how network-coding can be applied to a deterministic broadcast approach, resulting in significant reductions in the number of transmissions in the network. We propose two algorithms, that rely only on local two-hop topology information and make extensive use of opportunistic listening to reduce the number of transmissions: 1) a simple XOR-based coding algorithm that provides up to 45% gains compared to a non-coding approach and 2) a Reed-Solomon based coding algorithm that determines the optimal coding gain achievable for a coding algorithm that relies only on local information, with gains up to 61% in our simulations. We also show that our coding-based deterministic approach outperforms other coding-based probabilistic approaches.

More specifically, we show how network coding can provide significant gains when applied to a deterministic broadcasting approach. We apply coding to a partial dominant pruning (PDP)-based deterministic approach for illustrating our algorithms but since our algorithm executes locally at each node, it can be directly applied to other localized deterministic approaches for broadcasting.

BRIEF DESCRIPTION OF THE DRAWING

The teachings of the present invention can be readily understood by considering the following detailed description in conjunction with the accompanying drawings, in which.

DETAILED DESCRIPTION

An exemplary embodiment of the invention will now be described while referring to the figures, several of which may be simultaneously referred to during the course of the following description.

We first describe the partial dominant pruning (PDP) algorithm and then describe the gains that can be achieved by adding coding algorithms to a deterministic broadcast approach such as PDP.

We now describe the PDP algorithm. Let N (u) represent a set of neighbors of node u, including u and let N (N (u)) represent the two-hop neighborhood of node u. Let u send a broadcast packet to v, choosing v as its forward node; v then selects a forward list, which contains the minimum number of broadcast nodes that would re-broadcast packets to cover all nodes in its 2-hop neighborhood, N (N (v)). Among nodes in N (N (v)), nodes in N (u) have already received the packet while nodes in N (v) will receive the packet when v broadcasts it. Further, neighbors of nodes common to nodes in N (u) and N (v), i.e. (N (u)∩(N (v)) will also receive it. Thus, v just needs to determine its forward node list F (u, v) from nodes in B (u, v) to cover nodes in U (u, v)=N (N (v))−N (u)−N (v)−N (N (u)∩N (V)). A greedy set cover algorithm is used for the selection of these forwarding nodes—basically, at each step, the node in set B that covers the maximum number of nodes in U is added to the forward list, until either all nodes in U are covered or no more nodes can be added to the forward list.

Figure 1A:
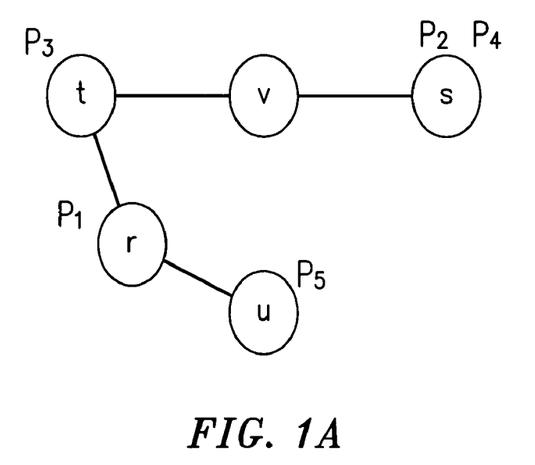
FIGS. 1A and 1B show an exemplary network as used in connection with the present invention and a corresponding neighbor reception table.
Figure 1B:
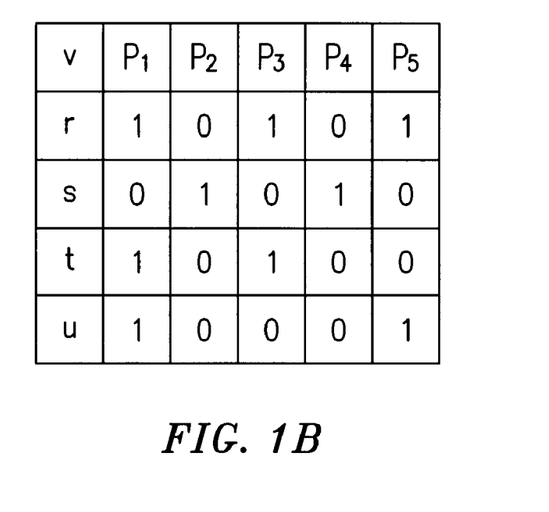

Let us consider a 5 node network shown in FIG. 1(a). There are four source nodes, r with packet $p_1$, s with packets $p_2$, $p_4$, t with packet $p_3$, and u with packet $p_5$. When each of these nodes executes the PDP algorithm, they would determine that node v is the forwarding node that would cover each of their respective two-hop neighborhoods. Thus, node v would be chosen as the forwarder for packets $p_1$ to $p_5$, in this example. As each of the source nodes transmits packets $p_1$ to $p_5$, node v builds its neighbor reception table as shown in FIG. 1(b). Each row represents one neighbor node of v and each column represents whether the neighbor node received the respective packet or not (denoted by 1 or 0, respectively). Note that, node v is aware of its 2-hop neighborhood information and thus, when node r transmits packet $p_1$, it can deduce that nodes t and u, which are neighbors of r also receive the packet.

Given this neighbor reception table, in the basic PDP algorithm, node v has to broadcast each of the packets $p_1$ through $p_5$, as at least one of its neighbors is missing this packet. This results in a total of 5 transmissions for forwarding. Now consider a simple XOR-based coding approach. Suppose node v broadcasts $p=p_1 \oplus p_2$. Nodes r, t, u recover $p_2$ by simply doing $p \oplus p_2$; node s recovers $p_1$ by simply doing $p \oplus p_2$. Thus, in one transmission, both $p_1$ and $p_2$ are delivered to the neighbors of node v. However, packets $p_3$, $p_4$, $p_5$, need to be transmitted individually as XOR does not help in this case. Thus, a total of 4 transmissions are sufficient when an XOR-based coding algorithm is used. As we discuss later, the problem of computing the set of packets Q to XOR such that the maximum number of neighbors in $N_1$ (u) will decode a missing packet in one transmission while the rest have gotten all packets in Q is NP-hard. We use a greedy heuristic for our XOR-based coding algorithm.

Let's now consider packets $p_1$ through $p_5$, again, but in a more general context. Nodes r, s, t, u each are missing at most 3 packets. We need to send an appropriately coded combination of packets $p_1$ through $p_5$ such that each of these nodes recovers their respective missing packets. In order to come up with such a coded combination, consider forward error correction (FEC) codes, specifically Reed-Solomon codes used between a sender and a receiver, that guarantees the property that by sending n+k bits, the receiver can recover from erasures in any k bits. Now, in our example, if node v sends 3 packets using Reed-Solomon codes as a broadcast, each of the nodes r, s, t, u can independently recover up to any 3 missing packets out of the 5 packets. Note that, unlike the XOR based approach, this requires some batching. However, batches are local to a node and its neighbors, unlike the generations in Fragouli that are global in scope. As we show in detail later, a Reed-Solomon code-based algorithm can be used to create the coded packets for broadcasting, resulting in the optimal (fewest) number of transmissions. Thus, in this example, we can reduce the number of transmissions for the forwarding node v, from five to three broadcasts, thereby increasing the broadcast efficiency of the network.

CODEB Overview

In accordance with the present invention, we introduce CODEB, a new coding-based broadcast protocol for ad-hoc networks. Similar to COPE as set forth by S. Katti, D. Katabi, W. Hu, H. Rahul, and M. Medard, in "The importance of being opportunistic: Practical network coding for wireless environments," in *ACM Sigcomm*, September 2006, CODEB inserts a coding layer between the IP and MAC layer which detects coding opportunities and exploits them to reduce the number of transmissions needed.

CODEB Incorporates Three Main Techniques:

Opportunistic listening: Nodes in CODEB operate in promiscuous mode equipped with omni-directional antennae. Nodes snoop all communications over the wireless medium and store the overheard packets for a limited period T. Nodes also periodically broadcast the set of nodes it can hear (i.e., its one-hop neighbors) to all its one-hop neighbors. This allows each node to build a two-hop neighbor graph; given this and the previous hop u of a packet p, node v can infer (assuming broadcast is reliable; else, a NACK-based scheme can be used for reliability) that the neighbors of u has received p. If p is a coded packet, other inferences are possible as discussed later. Based on this, each node creates a neighbor reception table as shown in FIG. 1(b). If a new packet cannot find any coding opportunities, the packet can either be sent to the interface queue directly, or be buffered in the coding layer for some time. For delay tolerant applications, buffering can increase coding opportunities. Note that, we do not broadcast "reception report"—the set of packets a node has received.

Forwarder selection and pruning: Unlike a gossiping based approach where all nodes serve as forwarders with a given probability, we pick a subset of neighbors as forwarders. We use a PDP algorithm to select forwarders and maintain forwarder selection independent of coding, thereby allowing our scheme to be used with other forwarder selection algorithms. The forwarder set is stamped in the packet header and a node only rebroadcasts a packet when it is chosen as a forwarder. Note that, due to opportunistic listening, even if a node is a forwarder of a given packet, it does not necessarily have to send the packet if it determines that all its neighbors have received the given packet.

Opportunistic coding: By opportunistic coding, we mean that each node examines its set of to-be-forwarded packets and its current neighbor table obtained through opportunistic listening, and dynamically determines if it can exploit coding opportunities to send coded packet(s), instead of sending native packet(s). For example, suppose a node u has two packets p and q, and two neighbors v and w. If u knows v has p and w has q through overhearing, then u does not have to send p and q, it can just send p XOR q. Our two algorithms try to exploit these coding opportunities. As discussed, we present two algorithms for coding packets: 1) a simple XOR-based algorithm that tries to XOR a number of packets in the buffer to enable the maximum number of nodes to decode a new packet and 2) an optimal coding scheme that makes use of Reed-Solomon code as the coefficients for linearly combining native packets. Note that, opportunistic coding for broadcast is very different from coding for unicast, such as COPE. In unicast, only the intended next hop needs to receive a given packet. However, for broadcast, all the neighbors must receive the given packet. To appreciate the difference between COPE and CODEB, for the XOR-based algorithm, to find the optimal number of packets to XOR, both problems are NP-hard. However, in the case of COPE, the problem is the same as finding a maximum independent set, and the problem is hard to approximate within a constant factor (reduction omitted for lack of space). In the case of CODEB, it is actually the same as finding a maximum hypergraph matching which is also difficult to approximate within a constant factor. For the linear code-based solution, there exist optimal and efficient polynomial algorithms for CODEB. The same algorithm, however, is not optimal for COPE.

Figure 2:
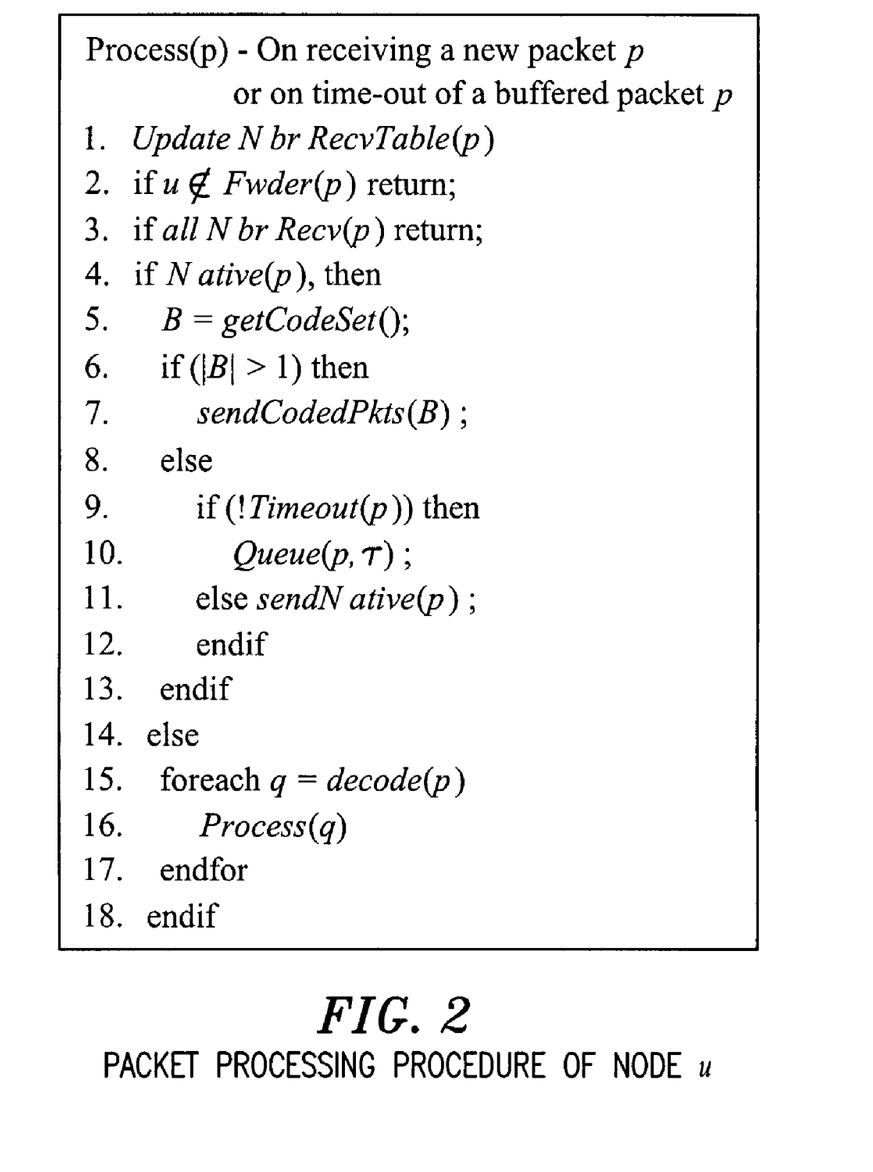
FIG. 2 shows an exemplary packet processing procedure in accordance with the principles of the present invention.

We now briefly describe the algorithm used in our CODEB broadcast protocol of the present invention. The pseudo-code is shown in FIG. 2. We assume nodes exchange their neighbor information so that each node knows the network topology within its 2-hop neighborhood. When any packet is received, the node first updates its neighbor table (line 1). In PDP, for each native packet, only a subset of neighbors is delegated as forwarders; other nodes do not re-broadcast (line 2). If node u is a forwarder, but based on its neighbor table it determines that all its neighbors have already received the packet, it does not re-broadcast (line 3). Otherwise, node u tries to see if it can get any coding opportunities by encoding the packet with a set of already received packets that it needs to forward. (line 5). If yes, we will generate one or more encoded packets and schedule the transmission (line 7). If not, for delay tolerant applications, the node will buffer the packet for a random amount of time (line 10) and process it later. This can create more coding opportunities. For non-delay tolerant applications, we send the packet immediately (line 11). Finally, if the received packet is a coded packet, we decode it before processing the packet (line 15,16).

Packet Encoding Algorithm

The function getCodeSet()implements the packet coding algorithm. In this section, we present two encoding algorithms: a greedy XOR-based algorithm and the optimal Reed-Solomon code-based algorithm.

1) XOR-based algorithm: For the XOR-based algorithm, we design for simplicity. Once we make use of a native packet p to XOR and send an XOR-ed packet with it, we will purge p. When a node receives an XOR-ed packet, and if it can not decode any missing packet with the help of packets in the packet pool, it will drop the packet. In more detail, each node u seeks to find a set of native packets Q to XOR. Let the set of neighbors of u, each of which can decode a missing packet be $N_1(u)$. The rest is denoted as $N_2(u)$. We require that, each neighbor in $N_2(u)$ have all the packets in Q from the neighbor packet reception table so that we can safely drop p once it is sent in an XOR-ed packet. Our goal is to maximize the cardinality of $N_1(u)$. We first show that the optimal XOR-based algorithm is NP-hard.

Theorem 1: Given a neighbor set N(u) of u, and a set of packets P of u in the output queue (i.e. interface queue). For each v, v∈N (u), let $P_v$ be the subset of packets u knows that v has received through opportunistic listening. It is NP-hard to find a set of packets Q such that $|N_1(u)|$ is maximized where for each neighbor $v \in N_1(u)$, $|Q-P_v|=1$, and for each $v \notin N_1(u)$, $|Q-P_v|=0$.

Proof: The proof is via a reduction of this problem from 3-dimensional matching. The 3D matching problem is stated as follows.

Definition 1: Given an instance of the following problem: Disjoint sets $B=\{b_1, b_n\}, C=\{c_1, \ldots, c_n\}, D=\{d_1, \ldots, d_n\}$, and a family $F=\{T_1, \ldots, T_m\}$, of triples with $|T_i \cap B|=|T_i \cap C|=|T_i \cap D|\times V$ for $i=1, \ldots, m$. The question is: does F contain a matching, i.e. a subfamily F' for which $|F|=n$ and $\cup_{T_i \in F'} T_i = B \cup C \cup D$?

For each element $e \in B \cup C \cup D$, we create a neighbor for u. For each triple (a, b, c), we create a packet. We assume only neighbor a, b, c has not received this packet. It is easy to see that a 3D matching of size n exists if and only if there exists a corresponding Q such that $N_1(u)=N(u)$ (each neighbor will be able to decode a missing packet).

Figure 3:
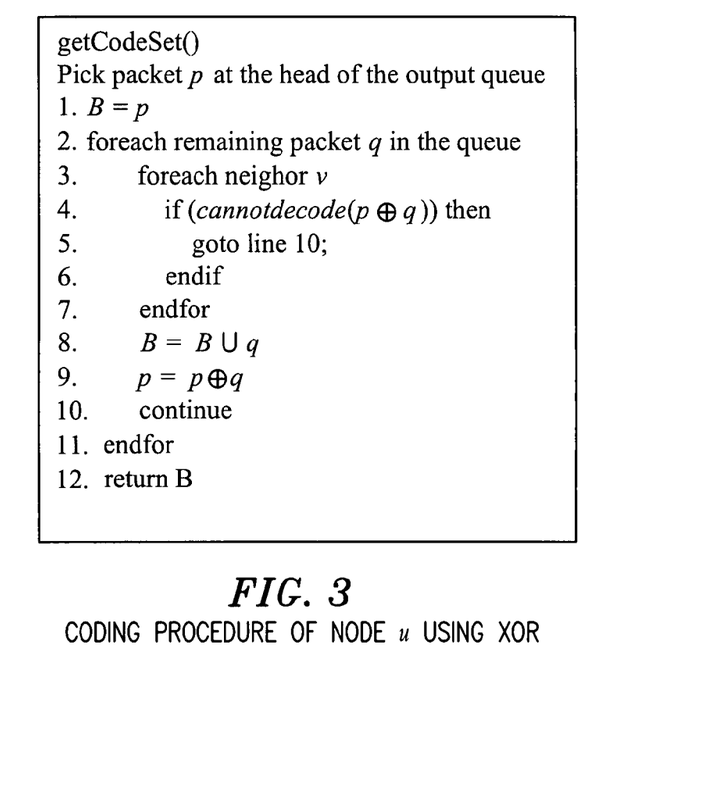
FIGS. 3 and 4 show exemplary coding procedures in accordance with the present invention.

Since the problem is NP-hard and also difficult to approximate within a constant factor (by noting that it is equivalent to maximum hypergraph matching), we design a practical greedy algorithm. The XOR-based greedy algorithm is illustrated in FIG. 3. The algorithm takes the packet p at the head of the queue (line 1) and sequentially looks for other packets in the queue (line 2) that when combined with p will allow all neighbors of node u to decode the packet (line 4-6). If successful, these packets are added to set B (line 8). Note that the C cannotdecode procedure uses the neighbor table obtained through opportunistic listening to ensure that all neighbors have already received at least |B|−1 of the packets in set B, in order to decode the coded packet.

2) Reed-Solomon code based optimal algorithm: Recall that we argued that the problem of finding the fewest number of coded transmissions to enable all neighbors to receive a batch of n packets can be solved using Reed-Solomon codes. We now formally show that the Reed-Solomon code (RScode) based algorithm is optimal for our problem. For ease of description, a packet p also denotes the vector where each element in index i is the corresponding byte in p. An ordered set of packets P also denotes the matrix where row i corresponds to the i-th packet in P.

Theorem 2: Let P be the ordered set of 3 n native packets in u's output queue. Let $P_v$ be the set of packets v has received, for each $v \in N(u)$. Let $k = \max\{|P-P_v|, v \in N(u)\}$. Let $$\Theta = \begin{pmatrix} 1^0 & 2^0 & \ldots & n^0 \\ 1^1 & 2^1 & \ldots & n^1 \\ \ldots & \ldots & \ldots & \ldots \\ 1^k & 2^k & \ldots & n^k \end{pmatrix}$$

be the k×n Vandermonde matrix (represents the Reed-Solomon code) where 1,2, ..., n are labels of elements in the finite field $F_2d$ (d=8 in our case for one byte). The minimal number of encoded packets that needs to be sent such that each neighbor v can decode the packets in P-$P_v$ is k and the set of k packets are given by $Q = \Theta \times P$.

Proof: Let $\Lambda_v$ such that $P_v = \Lambda_v P$. The proof is by noting that $$\begin{pmatrix} p_v \\ Q \end{pmatrix} = \begin{pmatrix} \Lambda_v \\ \Theta \end{pmatrix} P$$

and $$\begin{pmatrix} \Lambda_v \\ \Theta \end{pmatrix}$$

has full rank n.

Figure 4:
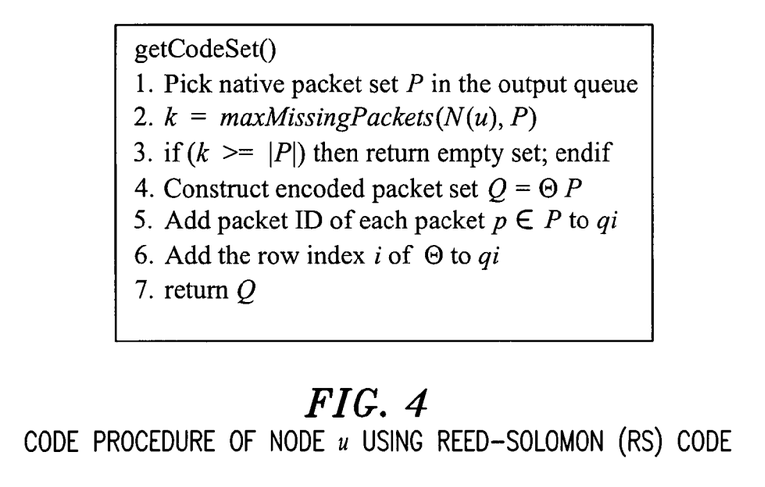
Figure 5A:
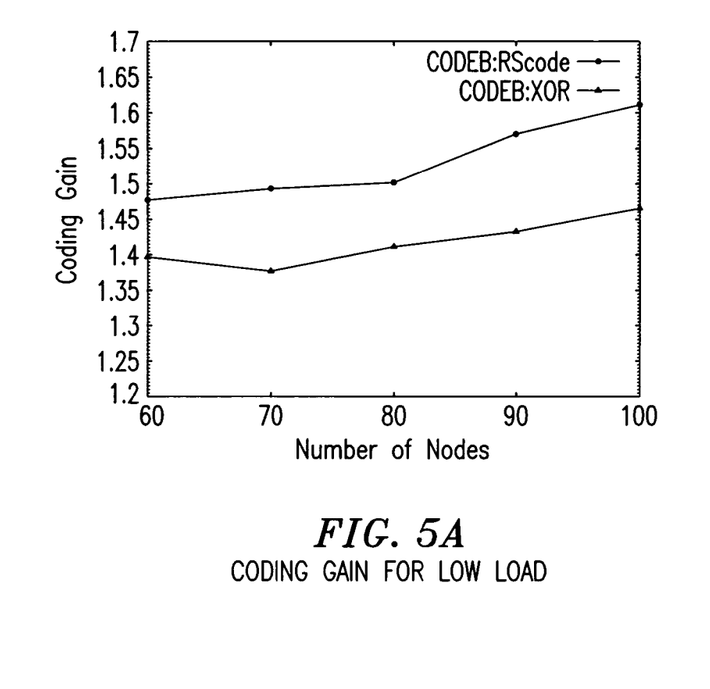
FIGS. 5-8 show exemplary performance comparisons for different coding methodologies in various given circumstances.
Figure 5B:
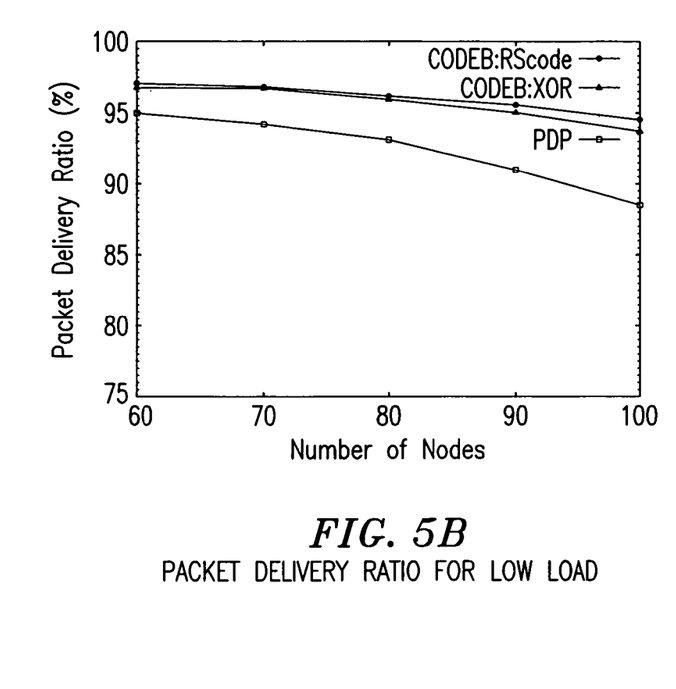
Figure 5C:
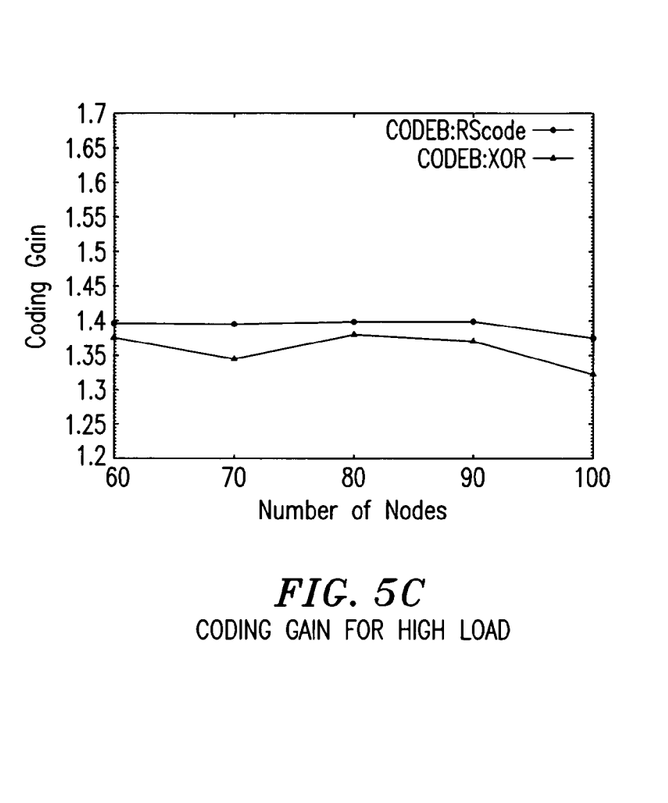
Figure 5D:
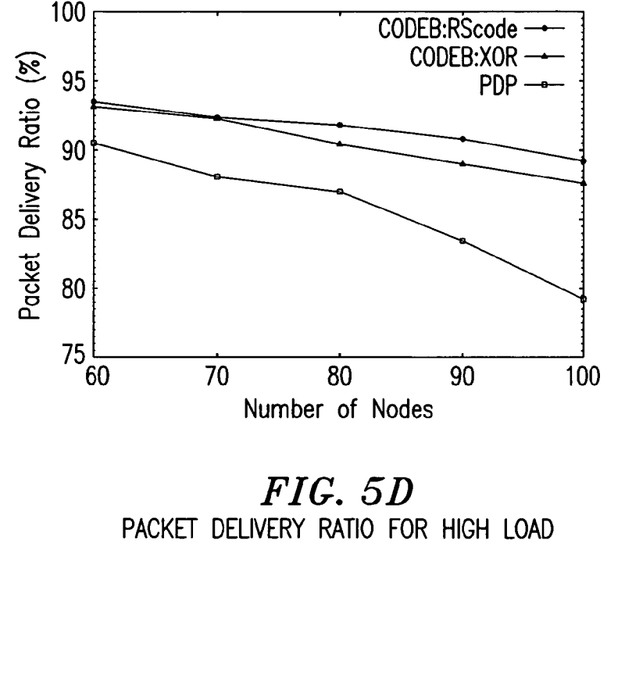
Figure 6A:
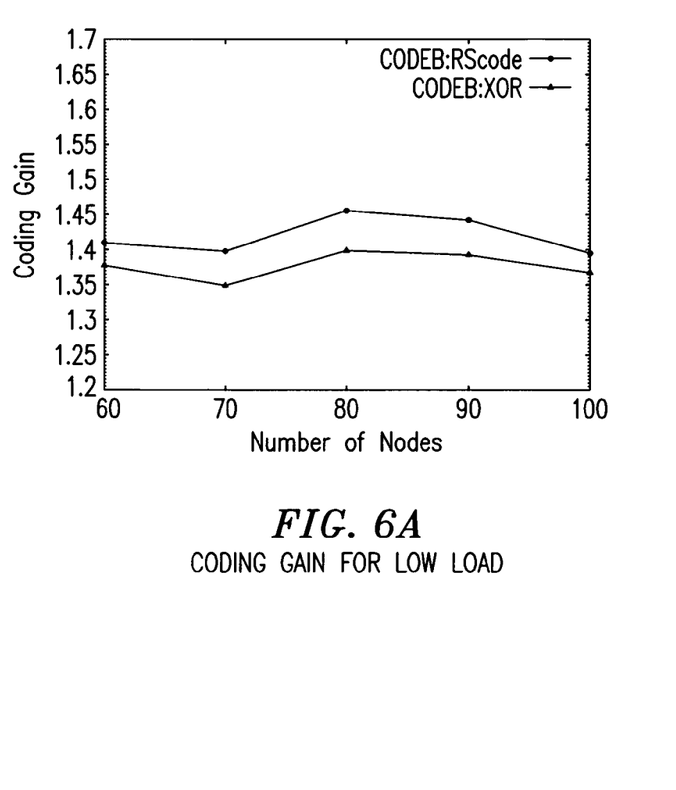
Figure 6B:
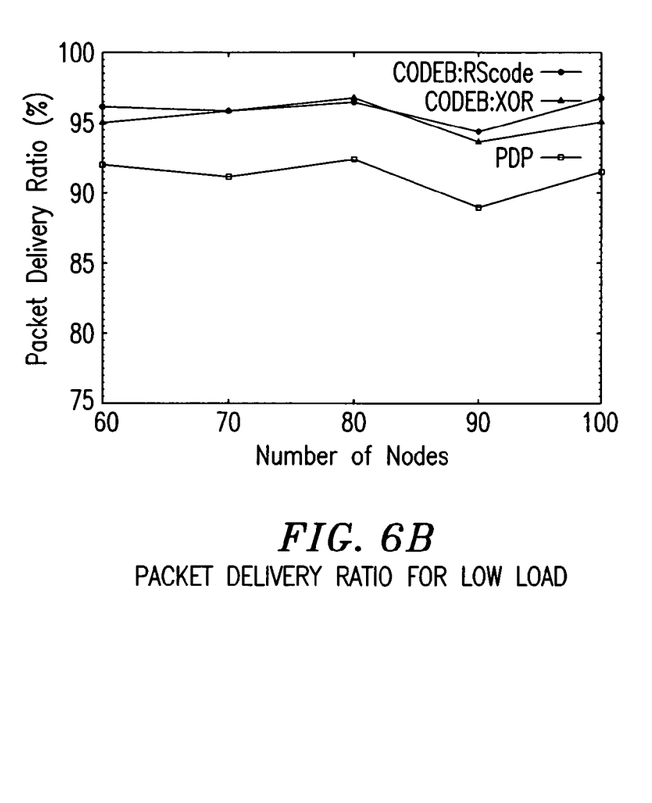
Figure 6C:
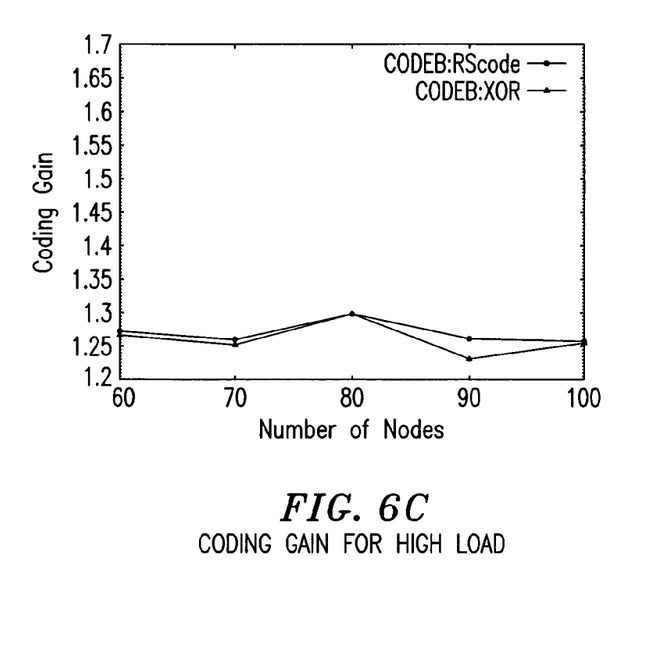
Figure 6D:
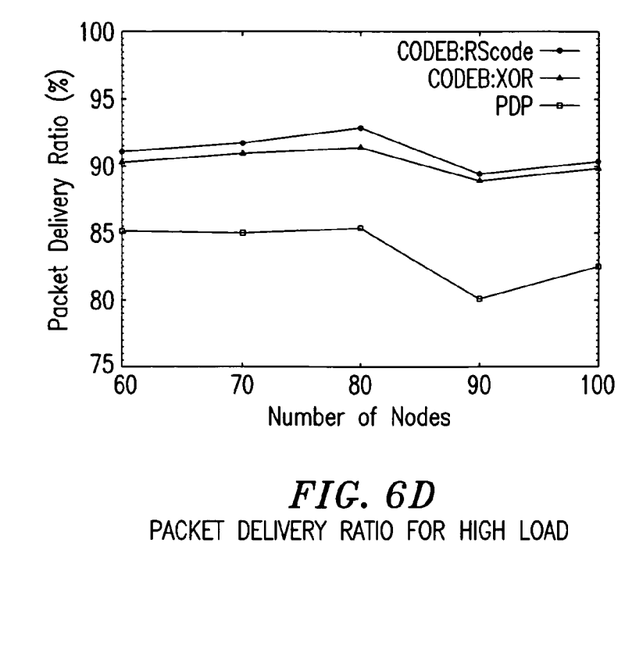

The pseudo-code of this algorithm is shown in FIG. 4. The algorithm constructs coded packet set Q=ΘP line 1-4). It then adds the set of native packet IDs to each coded packet (line 5). In practice, this set of IDs can be spread across the k packets. It then adds the index number of codes used (line 6). We do not have to add the row of coefficients to the packet since our coding scheme is deterministic. In contrast, random linear combination based schemes, such as in Fragouli, have to carry all the coefficients in the packet, resulting in significant overhead. Note that the RScode-based algorithm is very fault tolerant, as long as each node has received at least n-k distinct native packets (it does not matter which set), the node can decode the rest of the missing packets. To combat the unreliable nature of wireless links, one can proactively send more than k encoded packets or implement a NACK based scheme.

Packet Decoding

Similar to COPE, each node maintains a Packet Pool, in which it keeps a copy of each native packet it has received or sent out. The packets are stored in a hash table keyed on packet ID, and the table is garbage collected every few seconds. When a coded packet is received, the node decodes and then processes the packet (lines 15-16 in FIG. 2).

In the case of the XOR-based algorithm, when a node v receives an encoded packet consisting of n native packets, the node goes through the IDs of the native packets one by one, and retrieves the corresponding packet from its packet pool if possible. In the end, it XORs the n−1 packets with the received encoded packet to retrieve the missing packet q. Node v can now process packet q.

In the case of the RScode-based algorithm, when a node v receives an encoded packet consisting of n native packets (set P), v first goes over all native packets received in packet pool. It collects $P_v$, the subset of packets in P that it has already received. It then constructs $\Lambda_v$ and adds the new coefficient vector to matrix $\Lambda_v$. For each decoded native packet q, node v can now process q.

Pruning

For each packet p received, the procedure UpdateNbrRecvTable(p) in FIG. 2 updates the reception status of each neighbor of node u in the neighbor table based on the 2-hop neighbor set N (N(u)), Based on the neighbor table, if a node designated as a forwarder for packet p determines that all its neighbors have already received p, it can prune that transmission. When receiving a native or coded packet, we simply update the neighbors of the sender of packet p as having received the native packet or all the packets in the coded packet. We refer to this as update rule 1. Note that, for Reed-Solomon encoded packet p, this update rule prevents a node from purging already scheduled coded packets based on newly snooped packets (may need fewer than k coded packet). The reason is that, for a neighbor w of both u and v, both nodes u and v may assume (based on snooped packet from each other) that the other node will send the encoded packets in order for w to decode the missing packets, resulting in w not receiving any packets. Therefore, if one wants to prune scheduled coded packets, one has to use the following priority rule (update rule 2): node v can assume $w \in N(u) \cap (N(v)$ has received all underlying n native packets (packet IDs are in the header) if and only if ID (v)>ID (u). This is not needed if all coded packets are transmitted instead of opportunistically purged.

Analysis

We show that our CODEB algorithm enables all nodes to eventually receive the set of packets injected into the network as long as the network is connected and packet transmission is reliable.

Theorem 3: Given a set of packets P injected into a connected network G=(VE), CODEB enables all nodes to receive P eventually with the assumption that broadcast is reliable.

Proof: We only give the proof for update rule 2. The proof for update rule 1 can be proven similarly. It suffices to show that each node will eventually receive each packet p∈P. Suppose in the end, not all nodes receive p. Let $V_1$ be the set of nodes that has received p. Let $V_b$ be the set of "boundary"

nodes such that at least one neighbor v of u∈$V_b$ is in $V_1$. There are two cases: (1) v is a forwarder of p selected by previous hop; (2) v is not a forwarder.

For the first case, v will not send p in native or in coded packets if and only if v infers that u has received it. v must have snooped native p or coded packets q including p from a node w which u is a neighbor of w. If there are multiple such w, we pick w with the smallest ID. If the snooped packet is a native packet or XOR-coded packet, then u must have received it. If the snooped packet q is a Reed-Solomon coded packet, then ID(u)>ID(w). So w will either complete sending the batch of packets that enable u to decode p or stop halfway because another neighbor t (also a neighbor of u) with a smaller ID will take the responsibility for p or any other packet in the same batch. However, this chain will end at the node with the smallest ID. Otherwise, there will be a cycle where each node has a smaller ID than the previous node in the cycle, which is a contradiction.

For the second case, let t be the previous hop of v which v has gotten the packet p from in either native/XOR-coded packet or through Reed-Solomon decoding. There are two cases. Case A: t must have decided that some other node v' is a forwarder of p and v' is a neighbor of u, i.e. t must select a subset of nodes that "cover" all nodes within its 2-hop neighborhood. This goes back to case (1). Case B: t has decided that another node t' will cover u, according to PDP algorithm. This goes back to Case A. According to PDP there is no loop where each node assumes the previous one in the loop covers u.

The present invention including the CODEB algorithm was implemented in an NS2 simulator. For the testing, we use IEEE 802.11 as the MAC layer protocol. The radio model assumes a nominal bit rate of 2 Mb/sec and a nominal range of 250 meters. The radio propagation model is the two-ray ground model. Our application traffic is CBR (constant bit rate). The source-destination pairs (connections) are chosen randomly. The application packets are all 256 bytes. We have a total of 30 connections. We vary the sending rate of each connection to simulate varying load conditions. We use two sending rates: 2 packets/sec and 4 packets/sec. The first is referred to as low load and the second as high load. In the simulations, 60 to 100 nodes are randomly placed in a square grid with a fixed density. For each area of $\pi*250^2$, on average there are either 15 or 30 nodes to simulate sparse and dense topologies respectively. Each data point is averaged over 5 random topologies.

We use the PDP algorithm with a mark/unmark termination criterion. That is, based on the set of snooped packet, a node cancels a broadcast event if all of its neighbors have been marked (i.e. received the packet). If a node's 2-hop neighbor is marked due to the reception of a snooped packet, the node does not need to choose a forwarder to cover that neighbor. For the RScode based algorithm, we choose a batch size of 8. The per-packet overhead of CODEB with respect to PDP is small. It needs to include n (=8) packet IDs and the row index of the encoding matrix in k coded packets.

We use two metrics to compare CODEB with PDP. The first is the coding gain. The coding gain is defined to be the ratio of the number of transmissions required by a specific non-coding approach (PDP in this paper), to the number of transmissions used by CODEB to deliver the same set of packets to all nodes. The second metric is the packet delivery ratio which is defined for broadcast as the ratio of the number of data packets successfully delivered to the number of data packets generated by the CBR sources multiplied by the total number of nodes.

Static Networks

First consider the performance of the algorithms in dense networks, as shown in FIG. 5. As expected, the optimal RScode algorithm outperforms the simple XOR algorithm. For example, in the 100-node topology using low load, XOR can send 15% more packets than RScode. The packet delivery ratio of RScode is also slightly higher than XOR. The coding gain for the RScode algorithm can be as high as 1.61, which means that PDP sends 61% more packets than RScode algorithm. This gain occurs even as RScode delivers 6% more packets on average to each of the nodes compared to PDP. Compared to the low load case, the coding gain for the high load case is lower but the difference in packet delivery ratio between RScode and PDP widens to more than 10%. This is because losses predominate in the high load case, reducing the impact of coding opportunities. Overall, the coding gain is significant and ranges from 1.32 to 1.61.

Now consider the performance of the algorithms in sparse networks, as shown in FIG. 6. The coding gain for the sparse topology is generally less than that for the dense topology. This is because of limited opportunities for overhearing transmissions and fewer neighbors to exploit coding opportunities. The coding gain ranges from 1.22 to 1.45. The increase in packet delivery ratio is up to 8%.

Mobility

Figure 7A:
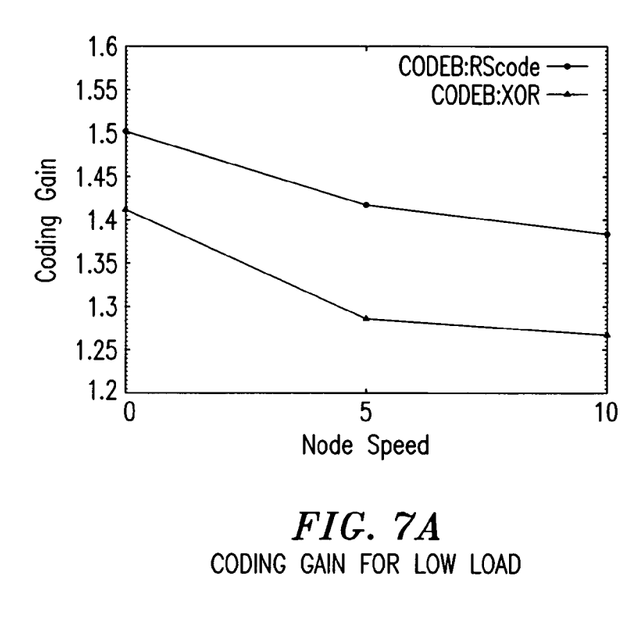
Figure 7B:
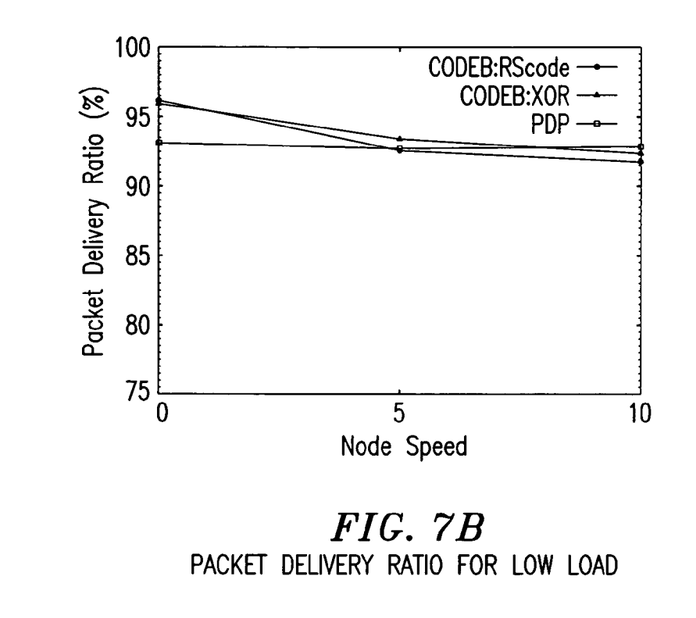

Let us now consider the performance of the algorithms with mobile nodes, as shown in FIG. 7. In this experiment, we have 80 nodes, a dense topology and low load. We use the random waypoint mobility model with zero pause time. The max speed is varied to 5 m/sec and 10 m/sec respectively. We see that there is a drop of about 24% in coding gain (from 50% to 38% for RScode algorithm) as node mobility increases from 0 to 10 m/s. This is due to the fact that the neighbor reception table gets less accurate in the presence of mobility. While a node based on this table might infer all its neighbors can decode its coded transmissions due to mobility or losses, those nodes may be unable to do so. Codes that allow progressive decoding capabilities may alleviate this to some extent. Another reason for lowered gains is because mobility itself is beneficial to all schemes including PDP, i.e., fewer packets are needed to cover all the nodes. For example, for a speed of 10 m/sec, PDP sends only 60% of what it sends for the static case (not shown in figure). Of course, mobility also results in lowered packet delivery ratio for all the schemes. A simple NACK-based protocol, where a node broadcasts a NACK identifying missing packets and one of its neighbors that has this packet, responds by rebroadcasting the packet, should help improve packet delivery ratio without sacrificing efficiency.

Comparison With Probabilistic Coding

Finally, we would like to compare the present invention with a coding scheme applied to a gossiping-based protocol. In this section, we compare CODEB to the coding-based broadcast approach which uses gossiping as proposed in Fragouli. We will refer to this scheme as CODE+GOSSIP. Since the Fragouli protocol uses an ideal MAC layer, we run CODEB with the same MAC layer for ease of comparison. We use the 80-node network with mobility to compare the two approaches. Again, each data point is averaged over 5 random topologies. We set the forwarding factor of CODE+GOSSIP to $(k/\min v_{1\in N(v)}|N(v)|)$ where k=3 for close to 100% delivery ratio. We also show results when k=2.

Figure 8A:
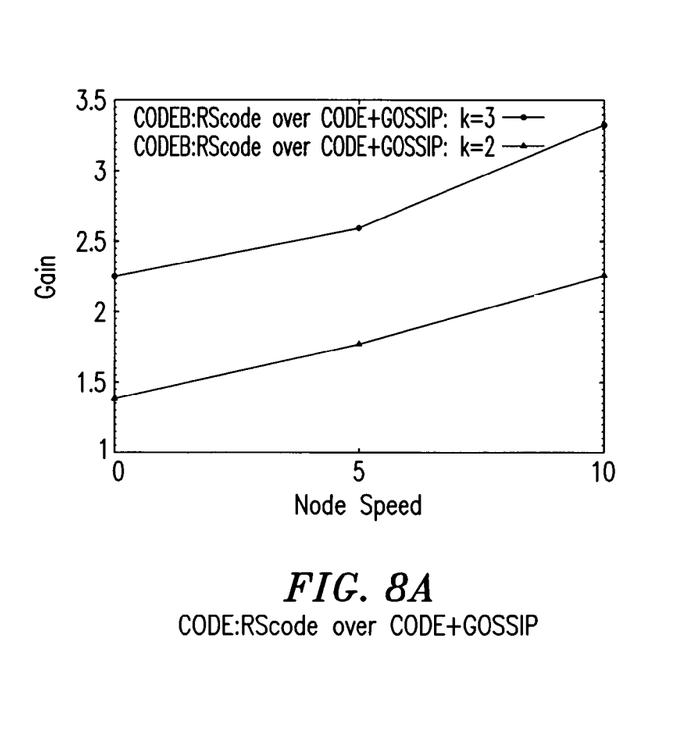
Figure 8B:
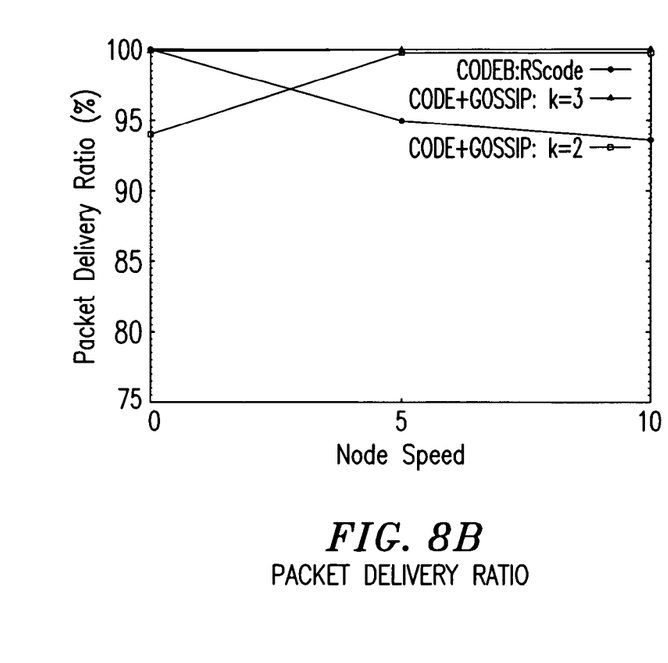

As we can see from FIG. 8, our CODEB approach sends significantly fewer packets. In general, CODE+GOSSIP results in far more transmissions as compared to CODEB— 40% to 120% more for no mobility to 120% to 230% for a node speed of 10 m/s, using k=2 respectively. This also highlights some of the difficulties of using a probabilistic approach, i.e., it is hard to tune the forwarding factor accurately. Lowering k from 3 to 2 can reduce the number of transmissions but also results in unpredictable lowering in packet delivery ratio (94% for static network with ideal MAC). Thus, while CODE+GOSSIP is more resilient to mobility compared to CODEB, it results in significantly more transmissions. The addition of a simple NACK-based protocol to CODEB, as discussed earlier, can increase the packet delivery ratio to 100% without significantly impacting broadcast efficiency.

Summary

In summary, the coding gain of CODEB can be as high as 1.6, which means PDP sends 61% more packets compared to CODEB. On top of the coding gain, CODEB also simultaneously improves the packet delivery ratio by as much as 10%. Among the two algorithms, as expected, the RScode-based optimal algorithm outperforms the XOR-based algorithm by up to 15%. The coding gain is higher when the network load is low or moderate (at high load, losses predominate) and when the networks are dense (more opportunities for coding when the number of immediate neighbors are higher). In the presence of mobility, the coding gain achieved by CODEB decreases by about 24% when node speed increases from 0 to 10 m/s. Finally, CODEB results in significantly fewer transmission compared to the gossiping-based coding algorithm.

Figure 9:
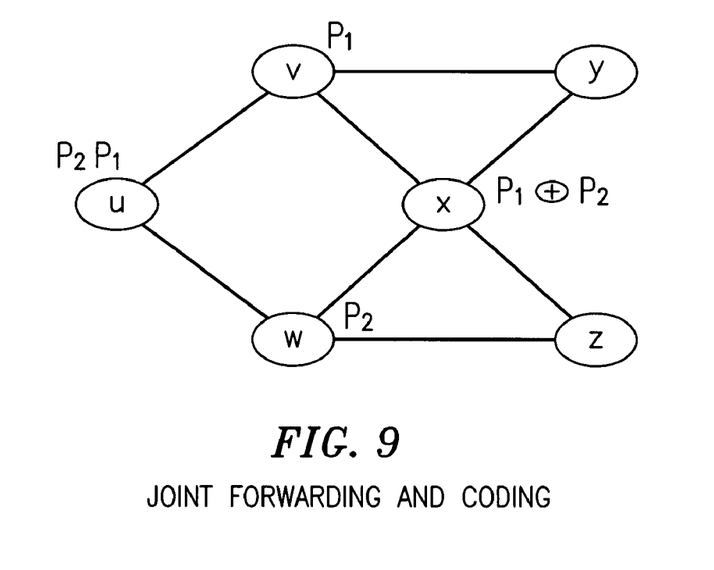
FIG. 9 another exemplary network of nodes used in connection with the methodologies of the present invention.

By separating the choice of forwarders (e.g. PDP) from how to code packets (CODEB), the present invention design favors simplicity. While this approach results in significant gains, one can envision a combined forwarding and coding algorithm that can perform better. For example, consider the network of nodes shown in FIG. 9. If node u originating packets p1 and p2, can determine both forwarding and coding within its two hop neighborhood, it can ask node v to send packet p1, node w to send packet p2 and node x to send packet p1$\oplus$p2, thereby allowing nodes y and z to receive both p1 and p2 in the least number of broadcasts.

Along the same lines, our design does not allow an encoded packet to travel more than one-hop and a node encodes native packets independently. There could be more coding gains if these conditions are relaxed. However, this may introduce coordination overhead and vulnerability in the presence of rapid topology changes. We have assumed that each node chooses the set of forwarders independently and explicitly. Nodes could also implicitly volunteer to be forwarders based on the local RF condition. This is especially important for adverse setting where links are very unreliable. In this context, one can also explore encoding packets using other codes that enable faster or incremental decoding as compared to Reed-Solomon code. For example, codes that allow progressive decoding could enable partial error recovery in the case of high link error rates or fast moving mobile nodes (if a node is missing k+1 packets, it may still be able to recover up to k packets using a code that transmits k coded packets).

There are other improvements one can do. A node can reduce the number of coded packets to send in a batch based on newly snooped packets. This requires purging pending packets from the output queue. A node can add a coded packet q to an "un-intended" batch b' if it is innovative to b' and encodes a subset of packets of the packets in b'. This enables faster decoding. There is an optimal batch size. It is interesting to investigate how to set it optimally. If the number of native packets exceeds the batch size, an interesting question is to find a subset of packets that fits the batch size and enable maximum number of missing packets to be received by the neighbors.

Broadcast operation is often used both to disseminate information to all nodes and for finding unicast routes in military ad-hoc networks. Therefore, broadcast efficiency is very important. Due to the potentially dynamic nature of ad hoc networks, localized algorithms are much more robust and effective with less maintenance overhead. In this application, we show how to incorporate network coding into a non-coding based localized algorithm called PDP for improving broadcast efficiency. While we illustrate our approach in the context of PDP, our CODEB coding algorithm can potentially be applied to other non-coding based schemes. The algorithm tries to optimize the coding gains given a set of native packets and the subset of packets each neighbor receives. We design two coding algorithms: an XOR-based simple coding algorithm that enables decoding without waiting for more coded packets to arrive and a Reed-Solomon-based coding algorithm that is optimal but requires a node to wait until it receives the appropriate number of coded packets. The first problem is NP-hard. We outline a simple greedy algorithm. The second can be solved efficiently and optimally using Reed-Solomon codes. Our extensive simulation shows that a non-coding based scheme sends as much as 60% more packets with a reduced packet delivery ratio.

Figure 10:
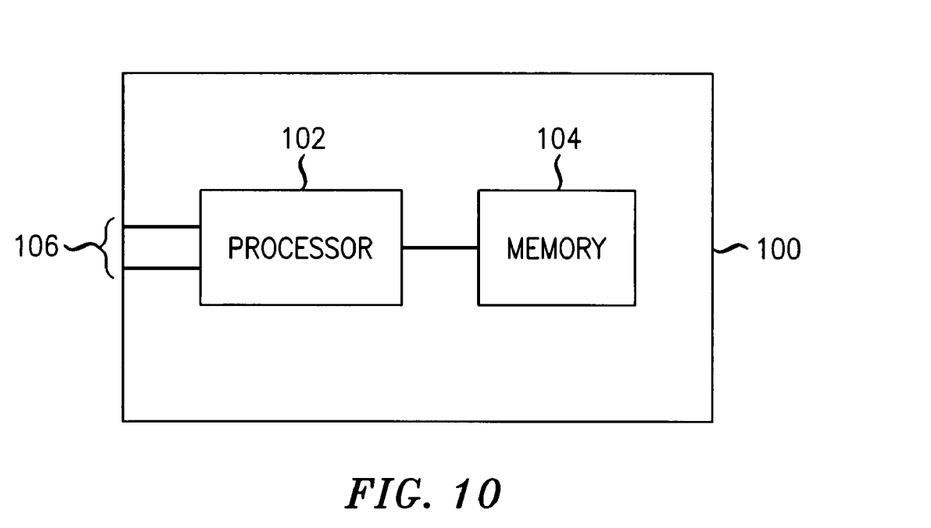
FIG. 10 shows one exemplary embodiment of a network node in accordance with the present invention.

Turning briefly to FIG. 10, a high-level block diagram of a representative node 100 for use in performing the methodology in accordance with the principles of the invention is shown. Node 100 has a stored-program-control based processor architecture and includes processor 102, memory 104 (for storing program instructions and data, e.g., for communicating in accordance with the methodology) and communications interface(s) 106 for wirelessly transmitting and receiving packets in accordance with the invention. In one embodiment of the invention the processing, coding and decoding of the packets is carried by stored programs that operate in connection with the processor and memory of the node 100.

While the invention has been shown and described in detail in the context of a preferred embodiment, it will be apparent to those skilled in the art that variations and modifications are possible without departing from the broad principles and spirit of the invention which should be limited solely by the scope of the claims appended hereto.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. For instance, the present invention will also be applicable to various types of 802.11-based mesh networks. Accordingly, the scope of the invention is limited only by the claims.

What is claimed is:

1. A method of performing broadcast operations of information to be transmitted from one or more sources to all nodes in an ad-hoc mobile communications network, said method comprising the steps of:
   determining at a node a set of forwarding nodes for retransmission of said information from said node to a given number of neighboring nodes in said network;
   deterministically rebroadcasting said information to said other given number of nodes in said network, wherein said information that is rebroadcast is done so utilizing opportunistic coding.

2. The method of claim 1, wherein said coding is performed utilizing an XOR-based coding algorithm.

3. The method of claim 1, wherein said coding is performed utilizing a Reed-Solomon coding algorithm.

4. The method of claim 3, wherein said coding algorithm determines the optimal coding gain achievable for a coding algorithm that relies upon local information.

5. The method of claim 4, wherein said deterministic approach is a partial dominant pruning (PDP) based approach.

6. The method of claim 5, wherein the forwarder set is stamped in the packet header and a node only rebroadcasts a packet when it is chosen as a forwarder.

7. The method of claim 1, wherein each forwarder node examines its set of to-be-forwarded packets and its current neighbor table obtained through opportunistic listening, and dynamically determines if it can exploit coding opportunities to send coded packets, instead of sending native packets.

8. The method of claim 1, wherein each forwarder node builds a neighbor reception table in order to determine which neighbor nodes receive given packets, such that the forwarder may deduce which neighbor nodes are able to receive packets from the forwarder.

9. A method of operating a node in an ad hoc mobile communications network for performing broadcast operations, wherein upon receiving a packet a node updates its neighbor table and delegates a subset of neighbors of said node as forwarders, said method comprising the steps of:
   determining whether opportunities for coding exist for encoding a received packet with a set of already received packets that needs to be forwarded;
   generating one or more encoded packets if opportunities for coding exist;
   if no coding opportunities exist and the packet is related to a delay tolerant application, then buffering the packet for a given amount of time in order to enable additional coding opportunities; and
   scheduling coded or non-coded packets for transmission.

10. The method of claim 9, wherein a step of coding includes the steps of: processing a given packet at the head of a queue and sequentially processing other packets in the queue that when combined with said given packet will allow all neighbors of the node to decode the packet, wherein, if successful, these packets are added to a set B of packets to be encoded using XOR or Reed-Solomon codes.

11. The method of claim 10, wherein for XOR encoding, said node uses a neighbor table obtained through opportunistic listening to ensure that all neighbors have already received at least $|B|-1$ of the packets in set B, in order to decode the coded packet.

12. The method of claim 10, wherein for Reed-Solomon encoding, said node uses a neighbor table obtained through opportunistic listening to ensure that all neighbors have already received at least $|B|-k$ of the packets in set B, in order to decode the coded packet.

13. The method of claim 9, wherein for Reed-Solomon encoding said node constructs a coded packet set Q, wherein a set of native packet IDs is added to each coded packet.

14. The method of claim 13, wherein the set of IDs can be spread across k packets, wherein a node adds the index number of codes used.

15. A node apparatus performing broadcast operations of information to be transmitted from one or more sources to all nodes in an ad-hoc mobile communications network, said apparatus operable to:
   determine at a node a set of forwarding nodes for retransmission of said information from said node to a given number of neighboring nodes in said network; and
   deterministically rebroadcast said information to said other given number of nodes in said network, wherein said information that is rebroadcast is done so utilizing opportunistic coding.

16. The apparatus of claim 15, wherein said coding is performed utilizing an XOR-based coding algorithm.

17. The apparatus of claim 15, wherein said coding is performed utilizing a Reed-Solomon coding algorithm.

18. The apparatus of claim 17, wherein said coding algorithm determines the optimal coding gain achievable for a coding algorithm that relies upon local information.

19. The apparatus of claim 15, wherein each forwarder node examines its set of to-be-forwarded packets and its current neighbor table obtained through opportunistic listening, and dynamically determines if it can exploit coding opportunities to send coded packets, instead of sending native packets.

20. The apparatus of claim 15, wherein each forwarder node builds a neighbor reception table in order to determine which neighbor nodes receives given packets, such that the forwarder may deduce which neighbor nodes are able to receive packets from the forwarder.

* * * * *